May 22, 1951  R. CHELMINSKI ET AL  2,553,958
SEDIMENTATION DEVICE

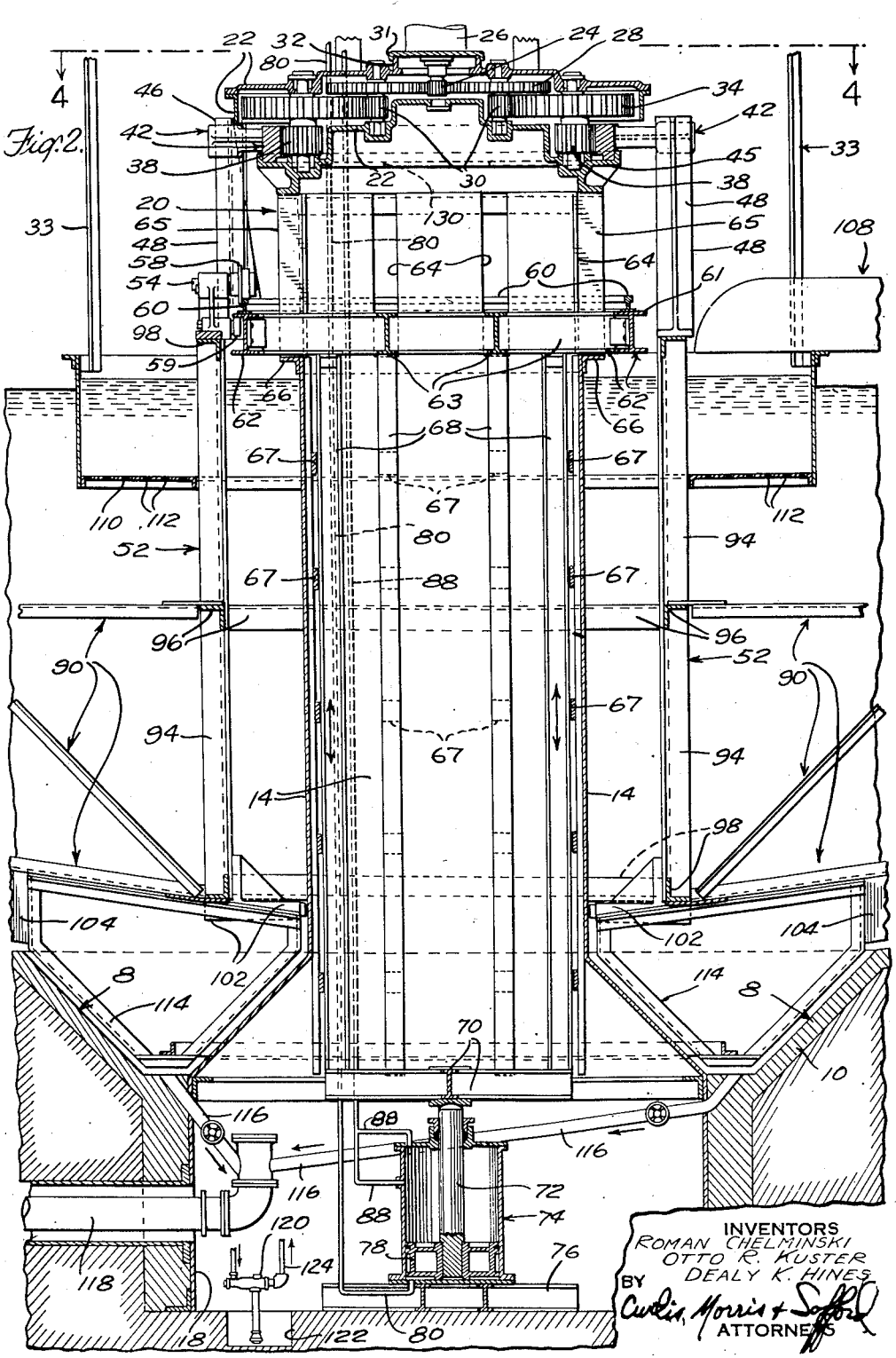

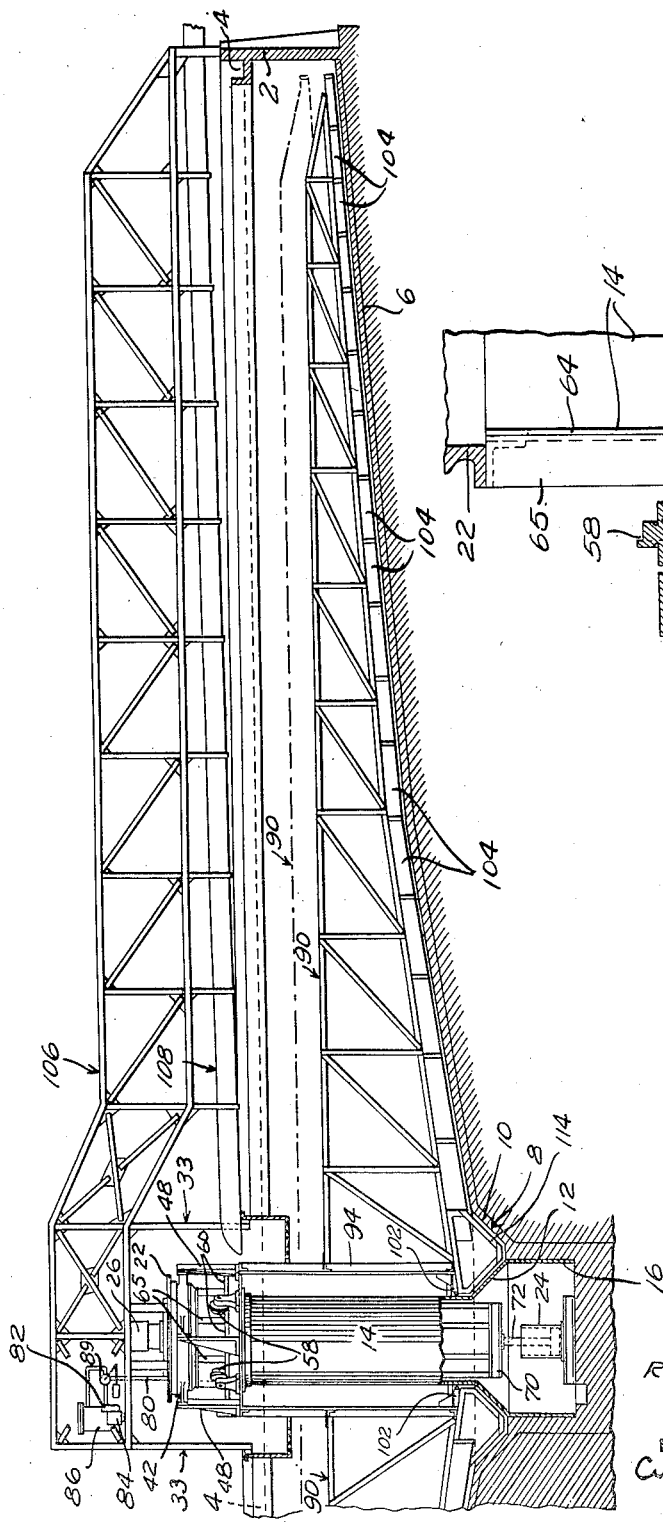
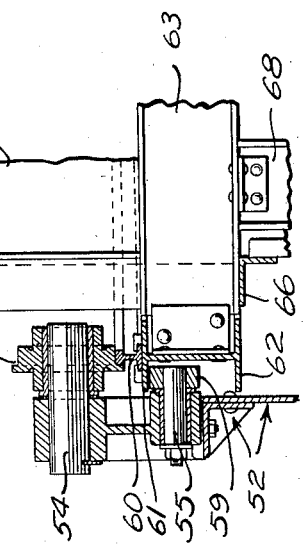

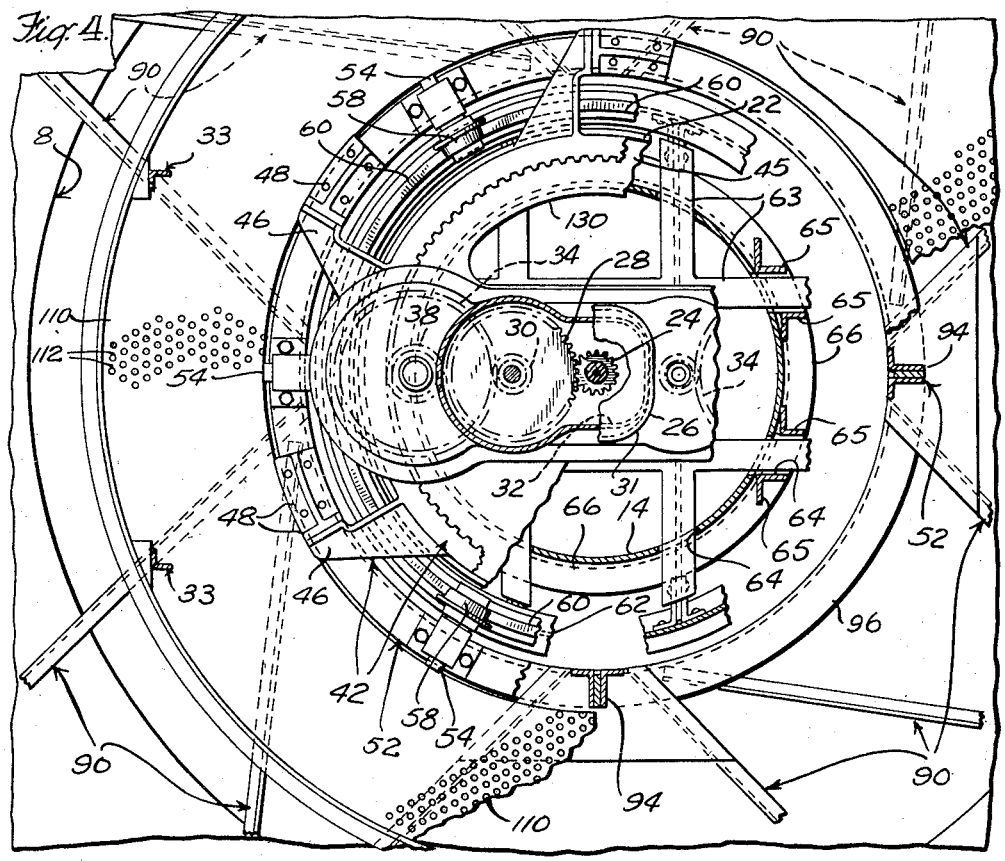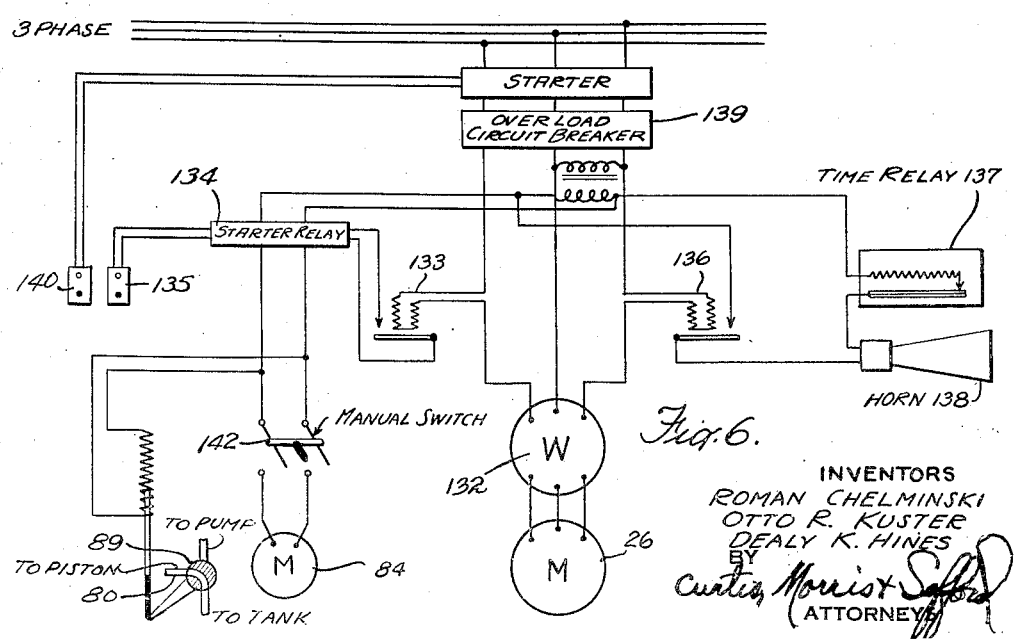

Original Filed March 26, 1945  7 Sheets-Sheet 5

INVENTORS
N. CHELMINSKI
R. KUSTER
DEALY K. HINES
BY
Curtis, Morris & Safford
ATTORNEYS

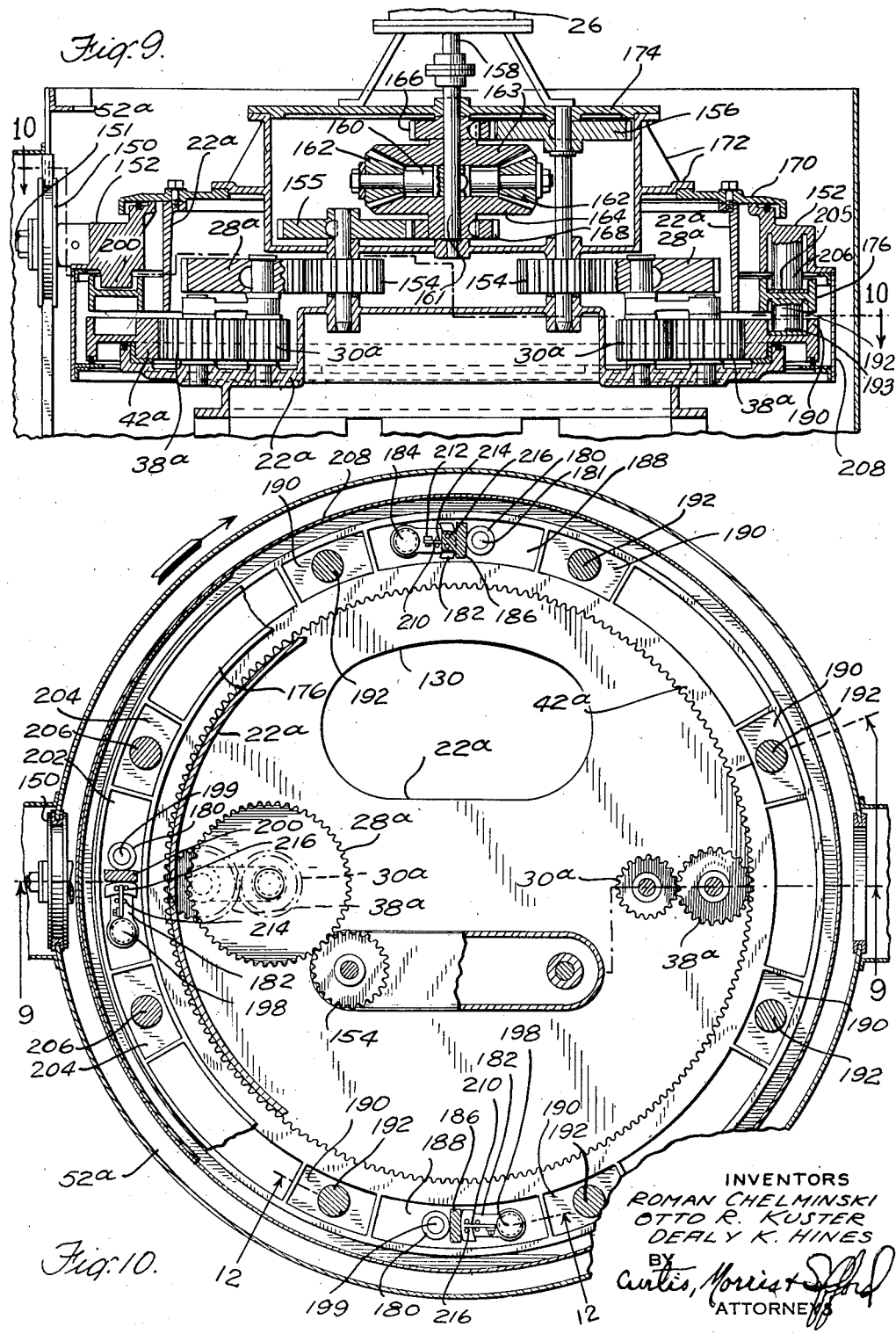

Patented May 22, 1951

2,553,958

UNITED STATES PATENT OFFICE 2,553,958

SEDIMENTATION DEVICE

Roman Chelminski, Wilton, Conn., and Otto R. Kuster, Larchmont, and Dealy K. Hines, Oceanside, N. Y., assignors to General American Transportation Corporation, Chicago, Ill., a corporation of New York Continuation of application Serial No. 584,974, March 26, 1945. This application April 14, 1945, Serial No. 588,278

20 Claims. (Cl. 210—55)

This invention relates to apparatus of the type in which slowly moving arms carry rakes, e. g., scraper blades or toothed rakes or chains, etc., over the bottom of a settling tank. Mechanism of this type is used in the thickeners or clarifiers of sewage disposal plants, in hydroclassifiers or hydroseparators, in concentrators, in treatment of industrial and metallurgical wastes, in slurry mixing tanks and other similar devices.

A general object of the invention is to improve the means for relieving overloads which may occur in apparatus of the aforementioned type, as a result of an accumulation of solids in the bottom of a tank over which the rakes are moved. Another object of the invention is to attain more efficient thickening, and to deliver continuously an underflow having a percentage of solids near the maximum which the apparatus is designed to handle, notwithstanding irregularities in composition of the influent, surges, and other conditions tending to irregular settling. Another object is to make more efficient use of lighter structural parts. A further object is to avoid stoppages and shutdowns of such apparatus. Still another object is to make such apparatus with all parts accessible for inspection and servicing.

The invention achieves these objects primarily by providing special means for vertically adjusting the rakes or scraper blades of apparatus during continued operation. It has been suggested, and in fact has become customary, prior to my invention to provide means for raising the sediment collecting arms in sedimentation apparatus of the type mentioned above. In general, this has been done by adjusting the scrapers or rakes upward and downward on the turntable or rotating connections. Such adjustments are ordinarily effected by hand or motor operated screws or by cams operated by reaction to excessive loads. None of these prior means, however, have been completely successful. In another type of apparatus heretofore devised the arms have been hinged to provide for the lifting thereof but since the hinging has been near the center of the spider-like structure the amount of lift at the center has been negligible and consequently the more commonly occurring overloads which result from accumulation of solids near the center of the tank are not relieved by this means. The type of apparatus which lifts a scraper-carrying shaft relative to its driving turntable on which it is supported and to which it is keyed cannot ordinarily be raised during operation under load, as the key binds in its keyway, and the greater the overload (i. e., the greater the need for lifting the rakes) the more impossible it becomes to effect the lifting. If the mechanism is stopped so as to relieve it of its load, the rapidly accumulating solids may get so far beyond the capacity of the scraper that, even with the blades lifted, operation cannot be renewed until the plant has been shut down and the accumulation dug out with pick and shovel. With the type which uses a cam for both driving connection and support so that increased torque causes the scraper assembly to ride up on the cam and lift the whole assembly, return to normal position cannot occur when the overload is relieved, but only when the loading drops far enough below normal so that gravity acting on the cam can cause rotational acceleration of the frame. This obviously cannot occur when the machine is under normal load; and what actually does occur in normal operation is that the blades move up a little under the first overload, move a little farther under each greater overload until the end of the cam slot is reached and then operation continues with raised scrapers as though no slot had been provided.

The present invention aims to eliminate the difficulties encountered with the prior art overload relief devices and to insure both positive relief and certain gradual return of the rakes to operative positions so that excessive sedimentation is allowed to accumulate under the rakes during conditions of excessive overload and is then gradually scraped up, together with the lighter accumulations of currently settling sludge during intervening periods. To this end means are provided for directly and positively lifting the rakes, such lifting being limited both in extent and duration to that required to meet the overload.

An important feature of the invention is the provision of means to effect the raising and lowering of the blade- or rake-carrying arms by a vertical movement which is independent of the rotation of the arms.

Other objects, important features and advantages of the present invention to which reference has not specifically been made hereinabove will appear in the following description and claims when considered in connection with the accompanying drawings.

In this specification and the accompanying drawings, I have shown and described a preferred embodiment of my invention and various modifications thereof; but it is to be understood that these are not intended to be exhaustive nor limiting of the invention, but on the contrary are given for purposes of illustration in order that others skilled in the art may fully understand the invention and the principles thereof and the manner of applying it in practical use so that they may modify and adapt it in various forms, each as may be best suited to the conditions of a particular use.

In these drawings:

Figure 2 is an enlarged view in vertical section taken on line 2—2 of Figure 1 with the upper part and the lateral portions broken away;

Figure 3 is a view, partly in vertical section partly in elevation, taken on line 3—3 of Figure 1;

Figure 4 is an enlarged fragmentary plan view partly in section of the central portion of Figure 1, with the superstructure removed to disclose the top of the pier and the driving mechanism;

Figure 5 is an enlarged, detailed view in vertical section of the rotatable supporting structure for the rotatable scraper frame;

Figure 6 is a wiring diagram of the automatic elevator control and alarm device;

Figure 9 is a view in enlarged axial section of the drive mechanism shown centrally in Figure 7;

Figure 10 is a cross-sectional view taken on line 10—10 of Figure 9;

Figure 1:
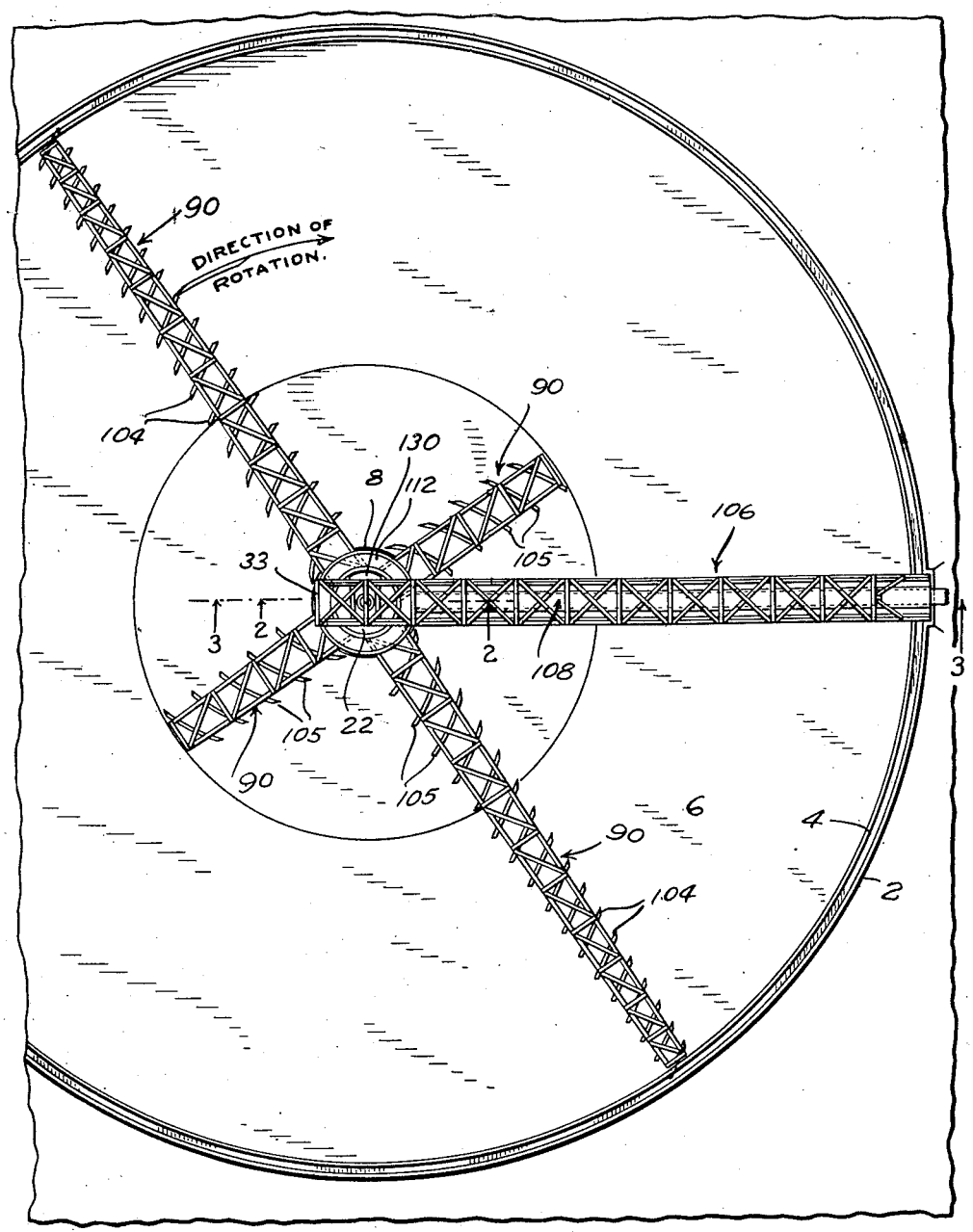
Figure 1 is a plan view, with a portion at the left-hand side broken away, of a sedimentation apparatus embodying the present invention.

In the illustrative embodiment of the invention the blade lifting mechanism is shown as incorporated in sedimentation apparatus comprising a circular tank which may be of reinforced concrete or other suitable material and which comprises an annular side or rim portion 2 carrying on its inner face an overflow launder 4. A gradually sloping bottom portion 6 empties into a discharge trench 8 formed, as shown, between the more sharply inclined part 10 of the bottom and a conical outward flare 12 on the central pier 14, on which is carried the operating mechanism for the arms hereinafter to be described and also for the center end of a bridge carrying a walkway and feed launder. The pier 14 also has, below the flare 12, a cylindrical bottom portion 16 extending into a concrete pit 18 in which various connections to the discharge lines may be located. The concrete pit 18 may be formed integral with the tank.

The pier 14, which may be either a hollow steel column or of reinforced concrete construction and which extends above the level of the liquid in the tank, has attached to its upper margin an annular reinforcing member 20 on which is supported the stationary body 22 for a speed reducing gear. This reduction gear comprises a pinion 24 driven from the vertical shaft of an electric motor 26, the pinion 24 engaging gears 28 to which are attached pinions 30, in turn respectively engaging gears 34 each having attached thereto a pinion 38 engaging the internal teeth on a driving spider 42. Such rotation and also a limited eccentric adjustment of the spider 42, by which the driving force is equally distributed among arms 48, is accommodated within the housing 22 with appropriate bearing 45.

The motor 26 is not fixed on the body 22 but is loosely held thereon by the interfitting flanges 31, 32. These flanges fit closely on the sides parallel to the common tangents to the pitch circles of gears 24 and 28, but have clearance (shown exaggerated in Figure 4) on the other sides. The torque reaction of the motor is taken by interengaging sides of the flanges 31 and 32, but the clearance on the other sides leaves the motor free for such limited lateral movement as will allow the pinion 24 to find an equilibrium position by rolling on one or the other of gears 28 and thus to equalize the driving torque applied through the parallel gear trains.

The spider 42 has, either attached thereto or preferably formed integrally therewith, arms or spokes 46 which engage, in all positions thereof, arms 48 carried by, and extending upwardly upon, the vertically adjustable scraper frame 52 which also includes the scraper or rake carrying arms, hereinafter to be described.

As will be apparent, it is not critical which of the rotary parts (i. e., the ring gear 42 and the frame 52) carries the vertical arms and which carries the arms 46, rollers 150, or other means for shiftable engagement; and it will likewise be apparent from what follows that it is not critical which of the supported and supporting members carries the circular track 60 and which the rollers or other bearing members 58.

As shown stub shafts 54 and 55 are appropriately secured on the frame 52; and flanged rollers or wheels 58 and 59 are rotatably mounted on these shafts to roll on the annular track 60 and beneath the flange 61, respectively. A second roller 59 is mounted beneath each roller 58 and beneath the flange on the frame 62 for the purpose of preventing the scraper assembly from lifting away from the track 60 or vice versa on lowering of the elevator, to prevent the track 60 from dropping away from the roller 58.

According to the present invention, the weight of the rotatable scraper frame and the parts carried thereby is carried on a bearing having a horizontal plane of rotation so that substantially no torque load is transmitted through it, and the torque reaction is carried separately through the members above referred to, which have vertical sliding faces and thus do not carry the weight of the rotatable frame. Elevator means is interposed in series with said horizontal bearing between the ultimate support points (on the rotatable frame and on the floor of the tank), in the embodiment shown. Such elevator means serves readily to adjust the rotational level of the rotatable frame while supporting it on its proper axis regardless of applied torque, because it is not required to resist and is not substantially affected by such torque. Such freedom from torque, as well as the requisite uniformity of lift to maintain the proper vertical axis in the rotatable frame is best attained by use of an hydraulic elevator positioned coaxial with the axis of rotation.

As shown the track 60 is supported through a frame 62, 68, 70 on an hydraulic jack or elevator 72, 74. This frame includes horizontal I beams 68 which extend through slots 64 in the pier 14, to the track 60 which they support. The beams 68 are riveted as shown or welded to and supported by the vertical frame members 68, e. g., channel bars, and these in turn are secured to and supported by a cross-head composed of horizontal beams 70 radiating from the center of the piston rod 72 of the hydraulic jack or elevator. The cylinder 74 of the hydraulic jack is mounted and secured on the bottom of the well 18 within the portion 16 of pier 14. The steel cylinder, of which the pier 14 is shown as formed in Figure 2 of the drawings, is preferably provided with annular reinforcing members 66 at the bottoms of the slots 64, and angularly spaced vertical reinforcing ribs 65, e. g., channel bars, which carry bearing pads 67 to guide the jack or elevator structure in its vertical movement.

The piston 78 is positively raised and lowered by pressure fluid introduced into the cylinder 74 below the piston 78 by means of a pipe 80 connected to a pump 82 operated by an electric motor 84. The pump 82 receives its supply of oil or other suitable fluid from the storage tank 86. Any oil in the cylinder 74 above the piston 78 may be returned to this tank 86 through pipe 88. When the device is to be lowered, gravity may be relied upon, controlled by flow through a restricted passage—in this case the solenoid operated three-way valve 89, by which either the pump 82 or the reservoir 86 may be connected with the pressure line 80—or the flow in pipes 80, 88 can be reversed by suitable valves.

The arms 90 which carry the scraper blades or rakes are shown as of skeleton steel construction and are suitably connected by other frame members 94, 96 and 98, to form the scraper frame 52. Attached to the inner face of the frame 52 are spring bumpers 102 serving to maintain the frame 52 centered with respect to the pier 14. It will be seen from the foregoing description that the scraper assembly 52 is suspended through the track 60 from the hydraulic jack 72, 74, 78, and can therefore be raised and lowered to lift the rake arms 90 away from or to lower them again close to, or into any desired operative relation to, the bottom of the tank.

Any suitable rake or scraper mechanism may be carried by the arms 90, for the usual purpose of gradually moving the settled solids from the peripheral portion of the tank down the incline to the discharge trench 8.

As shown more fully in Figure 2, a series of rake or scraper blades 104 are so inclined to the arms 90 with respect to the direction of rotation that each blade 104 serves to move the solids engaged thereby toward the center of the tank and into the path of the next blade toward the center upon the following arm 90. Since the arms move slowly there is substantially no turbulence; and settling continues in the interval between passage of the scraper blades. If desired, these blades, instead of all being straight, may as shown in Figures 1 and 4, be slightly curved as shown at 105 to increase the centripetal action thereof; or they may be part straight and part curved.

As shown in Figure 1, a skeleton steel truss 106, supported at its outer end upon the rim or side wall 2 of the tank and at its inner end upon the pier 14, carries a walkway, for an operator to service and/or inspect the sedimentation apparatus, and the feed launder 108, through which the slurry or pulp is delivered to the tank for treatment. As shown, there is also supported from this truss an annular distributor trough 110 having a perforated bottom 112. This feed trough surrounding the drum 14 and the frame 52 is in effect an extension of the launder 108 serving to deliver the slurry or pulp quietly into the central area of the tank.

In the discharge trench 8 the arms 90 carry specially shaped scraper blades 114 which serve to move the solids in the trench 8 into position to be drawn off through the branched discharge pipes 116 into a common discharge line 118. A water jet ejector 120 located in a sump 122 in the bottom of the pit 18 serves to remove through the pipe 124 any water or solution which may accumulate at the bottom of the center pier.

In Figure 6 is shown diagrammatically the apparatus by which the operation of the device is controlled. A wattmeter 132 in the circuit of the main driving motor 26 indicates the power consumption. When an overload is encountered the power consumption rises and is indicated on the wattmeter; when the power has reached e. g., about 80% of the permissible maximum, relay 133 responsive to such overload closes the circuit of the pump motor 84, e.g. through a standard starter 134, and opens it again only when the power consumption has dropped substantially, e. g., when it has returned to about 70% overload or even to normal. A standard push button starter switch 135 may be provided for manual control.

A second relay 136 also responsive to the main motor power consumption closes the circuit of an alarm 138 through a time delay switch 137, which as shown consists of a resistance heater coil and a bimetallic snap switch enclosed in common insulation so that the switch is heated during a short alarm period, e. g. 15 to 30 seconds and then cools slowly, e. g. over 5 to 10 minutes. A third relay 139 (shown diagrammatically as an overload circuit-breaker) opens the circuit of the main driving motor 26 in response to an overload which would be dangerous if continued.

Manually operated switches 140, 135 and 142 may be provided, if desired, to control independently the operation of the main motor 26, the pump motor 84 and the solenoid valve 89.

Further advantage can be secured in many cases by interconnecting a speed control for the motor 26 with the elevator, so that when the elevator is raised the rate of rotation is at the same time increased and thus a heavier feed of suspended solids can be taken care of without clogging the apparatus.

Instead of the solenoid valve 89 as shown, a fixed orifice may be provided to "bleed" oil past the piston at such a rate that the elevator returns from its uppermost position in a period of several revolutions of the scraper assembly, the capacity of pump 82 of course being sufficiently greater than the rate of "bleeding" so that the scraper assembly can be fully elevated during a fraction of its revolution period, e. g., at a rate of about one foot in 10-15 minutes. Or such bleeding, if it is desired to have a slower return, may be brought about by leakage past the piston within the cylinder 74.

In the operation of the device, the motor 26 operates through the gear train hereinabove described to drive the spider 42. When the spokes 46, of the spider 42, engage the vertically movable arms 48 on the scraper assembly 52, the latter is rotated on the rollers 58 running on the track 60 and the scraper 52 will thus be caused to turn, the rakes or blades 104, 105, and 114 being moved by arms 90 so as to gather the settled solids toward and into the central trough 8 from which they are pumped out as a concentrated slurry through pipes 116 and 118.

When the rake blades 104 and 105 encounter an overload of sedimented material on the bottom of the tank, or when it is desired that the arms and the rake blades supported thereby be raised for any other reason the rotary pump 82 is set in motion to drive oil into the cylinder 74 below the piston 78, thereby causing the piston 78 to rise and through the piston 72 to lift the track 60 and the scraper assembly 52.

If a heavy concentration of solids is temporarily fed to the apparatus, there will soon accumulate in the bottom a layer of concentrated sludge too heavy to be moved by normal operation of the scraper. As this occurs, the power consumption of the motor is increased and relay 133 operates to energize the motor 84 and to close the solenoid valve 89; and thus, by operating pump 82 to raise the hydraulic elevator and with it the scraper assembly 52. As this occurs the blades 104, 105 are lifted out of the heaviest concentration of solids until they reach a height where only normal power is required to operate. At that point the relay 133 operates to cut off the motor 84 and open valve 89 by de-energizing its solenoid; whereupon the assembly 52 begins slowly to drop back. If the abnormal concentration is brief the device may be able to scrape up the accumulated excess as it gradually drops back to normal; but if the high concentration continues the device may again reach a condition of overload such as will operate the relay and again be lifted clear. This will be repeated as often as necessary until the accumulated solids on the bottom have been scraped up and carried off in the discharge.

It will be apparent that the effect of this is not only to avoid stoppage and damage by reason of surges of high solids concentrations, but also to avoid handling excess water and to maintain near maximum solids concentration in the discharge. After a surge of high solids concentration a substantial layer of settled solids is left stored in the bottom of the tank. When this is followed by an abnormally low solids concentration the elevator, which is constantly seeking to lower the scrapers into the accumulation of solids, can do so without overload; and so gradually the excess solids are fed off at a time when the discharge would otherwise be excessively lean. Thus surges are smoothed out and a regular flow of uniform product delivered for subsequent operations.

The elevator frame 68 slides in its vertical movement on the bearing pads 67 which keep the elevator frame from clashing with the frame of pier 14. If desired pier 14 may be made of heavier sheet metal and the reinforcing members 65 omitted, in which case bearing pads 67 can also be omitted.

It will be noted that an important feature of the invention is the provision for the support of the scraper assembly 52 on a bearing apart from the driving gearing.

The arrangement as shown provides for ready access to the interior of the pier 14 and to all parts of the elevator or jack structure. Entry is had through a manhole 138 at the side of the reduction gear body 22; and from this one can climb down through the open framework of the elevator into the pit 18. The invention is, of course, not limited to the underground location of the sludge removal pipe.

In Figures 7 to 12, inclusive, is shown a modified structure embodying the invention. In this case a sheet metal drum 52a is used; and, in lieu of the upright extension 48, the drum itself is extended and vertical slots are provided with U-shaped bearing rails 48a on which the anti-friction rollers 150 travel, these rollers being rotatably mounted on stud-shafts 151 on the rotating ring 152.

Figure 7:
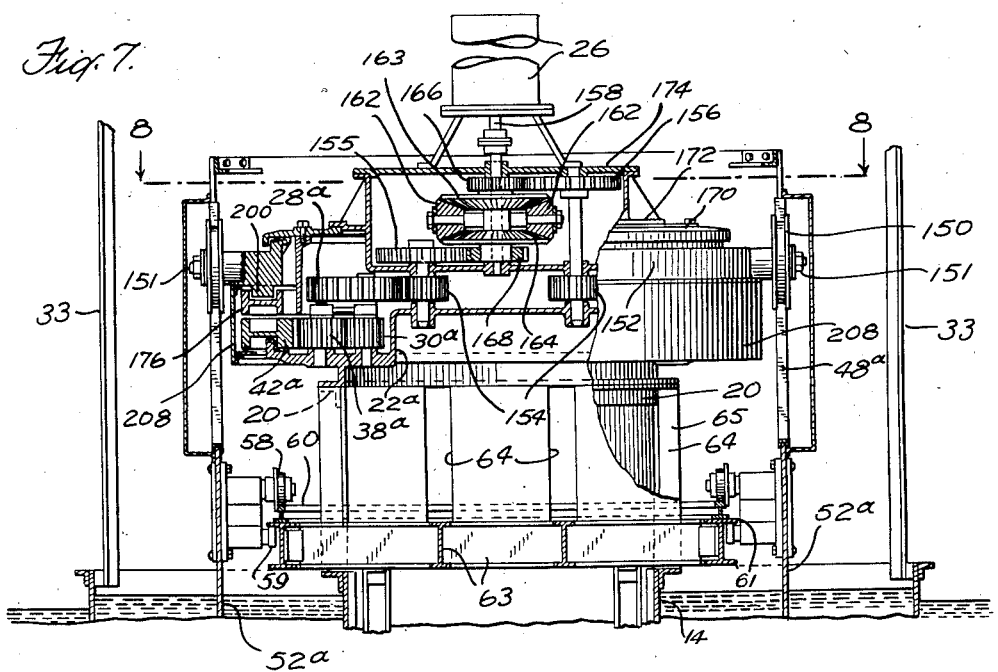
Figure 7 is a fragmentary view corresponding to the upper portion of Figure 2, but showing a different driving connection.
Figure 8:
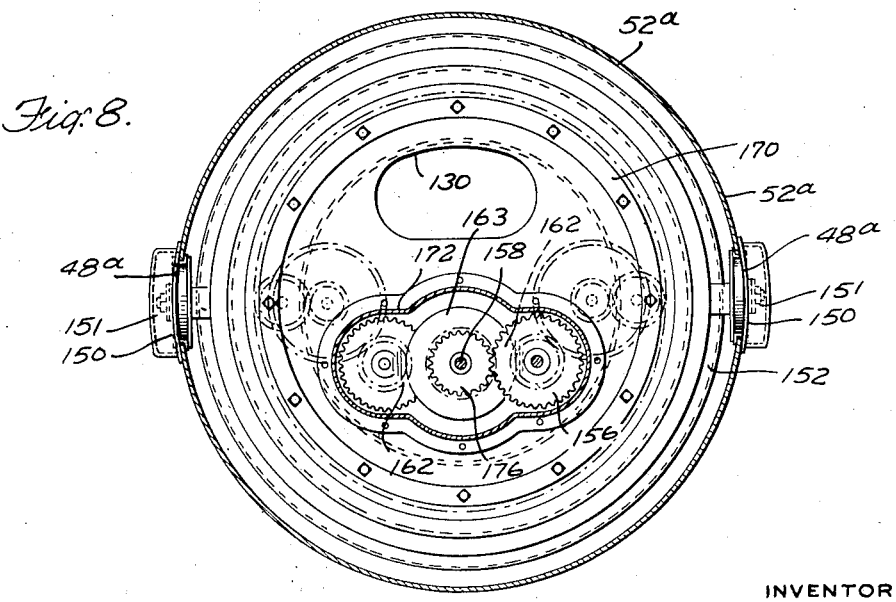
Figure 8 is a view partly in section and partly in plan taken on line 8—8 of Figure 7.
Figure 11:
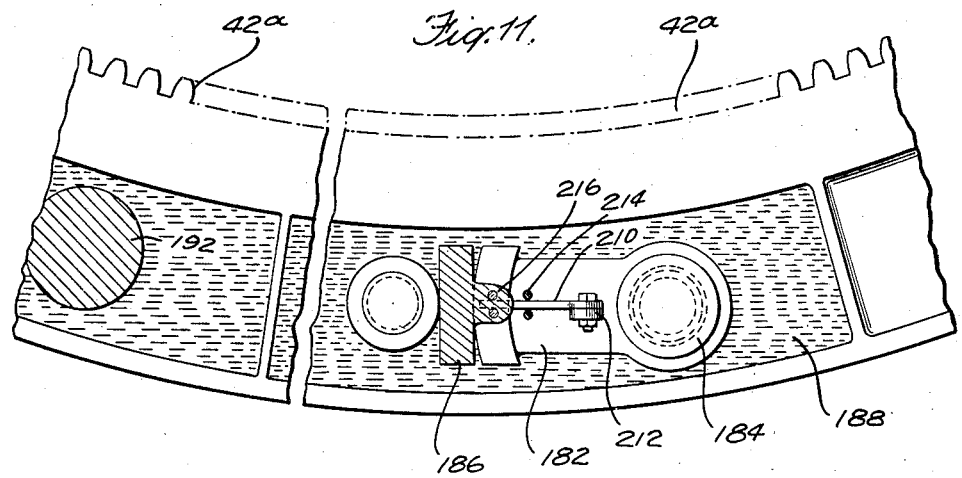
Figure 11 is an enlarged detail of a portion of the structure shown in Figure 10.
Figure 12:
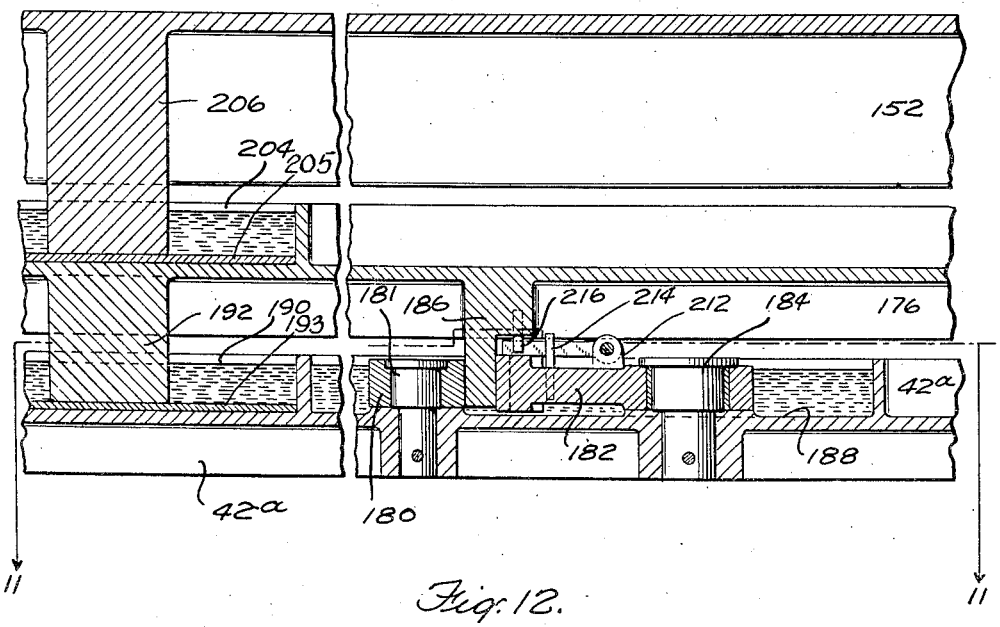
Figure 12 is a vertical section of the portion shown in Figure 11 taken on line 12—12 of Figure 10.

The rollers 58 and 59 are appropriately secured to the drum 52a as shown in Figure 7 and carry the weight of the rotating scraper on the elevator track 60, exactly as in the embodiment described in connection with Figures 1 to 6.

The elevator structure itself and the center pier may be identical with that shown and described above; but, instead of the frame 22 and drive mechanism therein contained as described in connection with Figure 2, there is shown here, and more particularly in Figure 9, a modified frame 22a carrying two trains of drive gears between the central equalizing gears to be described below and the annular gear 42a.

In order to insure a substantially equal division of the load between the two gear trains 154—28a—30a—38a, the motor shaft 158 is connected to these gears through a differential comprising a central spider 160 keyed on shaft 161 having rotatably secured thereon, a plurality of bevel pinion gears 162 and bevel gears 163 and 164 rotatable on the shaft 161 and intermeshing with gears 162. A drive gear 166 is connected to the gear 163 and this gear 166, in turn, meshes with the intermediate gear 156 to drive the gear train on the right-hand side of Figure 9. The lower gear 164 of the differential is keyed directly to a drive gear 168 which likewise drives the gear 155 and through it the gear train on the left-hand side of this figure.

Secondary frame members 170, 172 and 174 are fitted over the top and openings of the frame 22a and provide both an enclosure and support for this gearing as clearly shown in the drawings. The bottom portion only of a vertical driving motor 26 is shown in Figure 9.

Instead of a single spider 42 as used in Figures 1 to 5, inclusive, a composite spider is used in this case made up of three rings 42a, 176 and 152, as shown in Figures 9, 10, 11 and 12. Lower ring 42a, having a ring gear on its inner face, carries a roller 180 and a rocker arm 182 on a post 184 at each of two diametrically opposite positions. Between each rocker 182 and roller 180 is engaged a lug 186 projecting from the intermediate ring 176.

The roller 180 and the rocker 182 are received in a recess 188 formed in the ring gear 42a and other recesses 190 are formed at angularly spaced positions about the circumference of the ring into which bearing posts 192 are passed which extend from the intermediate ring 176. Each of the recesses 188 and 190 may be filled with oil so that the operation of these several parts are adequately lubricated over long periods of time.

The intermediate ring 176, shown in section in Figure 9 and a fragment thereof shown in plan at the left-hand side of Figure 10, has formed on the bottom thereof the bearing posts 192 and the driving lugs 186 and, on its top, the posts 198 and 199, corresponding to posts 181 and 184 of the ring 42a, similarly provided with rockers 182 and rollers 180 at positions 90° removed from the lugs 186. Between these rollers and rockers are received driving lugs 200 integrally formed on the bottom of the uppermost driving ring 152. Recesses 202 and 204 are provided in the upper face of the intermediate ring 176 corresponding to the recesses 188 and 190 in the ring 42a and serving the same purpose of maintaining a bath of lubricant. Bearing posts 206 extending from the bottom of ring 152 rest on the bottoms of recesses 204 thus providing a vertical thrust bearing in the same manner as posts 192 on bottom of recesses 190. Bearing plates 193 and 205 of bronze or other bearing metals suitably polished may be fitted in the bottom of recesses 190 and 204 respectively to provide a smooth, level bearing surface for lateral sliding of posts 192 and 206.

An apron 208 depending from ring 152 and felt gaskets at the periphery of frame 22a, on the lower periphery of ring 42a and on the upper periphery of ring 152 complete the closure of the housing for the drive member against dust, spray, etc.

In the operation of this drive, the torque applied from the drive shaft 158 is divided equally by the differential and applied through the opposite gear trains to opposite points of the gear ring 42a. The driving torque is transmitted through the posts 184 and the rockers 182 at the two diametrically opposite positions to the lugs 186 on the intermediate ring 176. Thus the intermediate ring is rotated and in turn transmits the torque through the post 198 and rockers 182 to the lugs 200 on the driving ring 152 and the latter transmits the driving torque through the studshafts 151 and the rollers 150 to the drum 52a.

Posts 181 and 199 with their rollers 180 are positioned to hold the lugs 186 and 200 respectively against the rockers 182 without play, so as to avoid overrunning and impact which might overload the driving connections.

It will be observed that the lugs 186 lie at opposite ends of one diameter and the lugs 200 at opposite ends of the perpendicular diameter, and that the rockers 182 and rollers 180 are designed to allow movements of these lugs along, but not away from, their respective diameters. Thus any eccentricity between drum 52a and the proper path of the ring gear 42a is freely accommodated in the same manner in which eccentricity between bearings of the shaft may be accommodated by the familiar Oldham couplings, and without objectionable stresses on the part concerned. Since any such eccentricity will require constant readjustment of the relative relations of the three rings 42a, 176 and 152 during rotation, it is important to have good and adequately lubricated thrust bearing surfaces. This function is provided by the bearing posts 192 and 206 and the wells 190 and 204 each provided with a polished bearing plate 193 or 205 in its bottom and filled with an appropriate lubricant.

This structure just described also takes up minor inaccuracies of dimensions to distribute the load between the bearing rolls 150. Thus assuming a condition in which the axis of the lefthand roll is slightly behind a true diameter, it would engage the drum 52a first and tend to transmit the entire drive. In case of a heavy load, however, there would be a slight yielding in the drum, tending to push its edge outward from its true circular position. Thus the lug 186 at the bottom of Figure 10 would move ahead of lug 186 at the top and the ring 152 thus moved to advance wheel 159 at the right of this figure into driving contact with drum 52a. This will of course result in a transverse movement of the ring 176 vertically on Figure 10, but this is accommodated by the rockers 182.

As shown in Figure 10, each of the rockers 182 is provided with a spring 210 secured to a lug 212 on the rocker. The action of spring 210 is restricted between pins 214 also secured on the rocker and pins 216 which are secured in lug 186 or 200 above the rocker on the next ring above. Thus, the spring 210 can always restore the rocker to a mid-position with respect to the mid-point of the driving lug 186 or 200 whenever it is relieved of load and thus resists any tendency to work over against one side or the other.

It should be noticed that the section of Figure 10 is taken at a higher level at the left than at the right of this figure, as indicated by line 10—10 on Figure 9, and that the section of the rings 42a, 176 and 152 and the drum 52a is taken at the upper branch of line 9—9 on Figure 10, whereas the other parts shown on Figure 9 are sectional along the lower branch of line 9—9.

It will be noticed also that, for greater clarity of showing, the section at the upper portion of Figure 10 is taken at a somewhat higher level than the section at the lower portion of this figure, the former passing through the portion of lug 186 which carries the pins 216 (as indicated also by line 11—11 of Figure 12), whereas at the bottom of Figure 10 the pins 216 are shown in section below the level of the part in which they are anchored.

This application is a continuation of our prior copending application, Serial No. 584,974, filed March 26, 1945, now abandoned.

We claim:

1. In an apparatus for the purposes set forth, the combination which comprises a tank having openings for feeding thereto liquid suspensions to be treated and for removing sludge and a separated liquid, respectively, a frame within said tank rotatable about a vertical axis and carrying at its bottom rakes moved over the bottom of the tank by the rotation of the frame, a central support for said frame on which it is rotatably mounted, means for lifting said support to move the rakes to various spaced relations to the bottom of the tank while maintaining rotatability of the frame, a driving motor and torque transmission connection, one of which is anchored with respect to the tank and the other is fixed to said rotatable frame, said torque transmission connection having angularly spaced bearing members and cooperating bearing members similarly spaced connected to said lifting means to be lifted and to fall with said frame, said bearing members being provided with smooth bearing faces which bear against each other in torque-transmitting pairs at least one of said bearing faces of each pair being vertical, whereby lifting and fall of said frame may be effected by said lifting means while maintaining the transmission of torque from the motor for rotating the frame and without acceleration or deceleration of rotation due to said lifting and fall.

2. Apparatus according to claim 1 in which the lifting means comprises a hydraulic cylinder and piston and hydraulic pressure and release means which actuate said hydraulic piston to effect the bodily lifting and lowering of said frame.

3. Apparatus according to claim 1 in which a hollow housing fixed in the tank encloses the lifting means from the liquid contents of the tank and is also provided with vertical slide bearings for holding said lifting means to a vertical axis.

4. Apparatus according to claim 1 in which paired vertically slidable bearing faces are on a fixed central frame and the central support, respectively, whereby said support and its lifting means are braced against rotational forces.

5. Apparatus according to claim 1 in which the central support comprises a hollow central housing enclosing the lifting means and in which the torque transmitting connection for effecting the rotation of said rotatable frame is supported on said housing, and said bearing members through which the driving torque is transmitted are radially beyond the housing.

6. Apparatus according to claim 1 in which the central support and the frame are provided one with an annular track and the other with wheels operating thereon, said frame being rotatably suspended on said track and wheels.

7. Apparatus according to claim 1 in which the central support for said frame comprises an annular track and the frame is provided with wheels operating thereon by which said frame is rotatably suspended from said track and in which the means for bodily lifting said frame comprises a hydraulic jack on which said annular track is supported.

8. Apparatus according to claim 1 in which a fixed central abutment and the lifting means are provided with paired cooperating bearings at least one of each pair being parallel to the axis of rotation for confining said lifting means to movements along an axis parallel to said axis of rotation of the frame during the raising and lowering operation.

9. Apparatus according to claim 1 in which a hollow central housing encloses the lifting means and in which the central support for said frame comprises an annular track concentric with the axis of rotation of said frame and surrounding said housing, said lifting means comprising a hydraulic jack within said housing and a supporting frame having a portion slidably fitted within and guided by said housing and having arms extending through and slidably fitted in vertical slots in said housing and supporting said track, said slots being entirely above the liquid level in the tank.

10. In a sedimentation apparatus having a tank with openings for feeding thereto liquid suspensions to be treated and for removing sludge and a separated liquid, respectively, rakes for moving sludge across the bottom of the tank toward said sludge removal opening, a frame carrying said rakes at its bottom and horizontally rotatable about a vertical axis to move said rakes around the bottom of the tank, and axially movable to vary the distance of the rakes from the bottom and thereby the thickness of any sludge residue left by the rakes, means for rotating the frame, a hollow longitudinally slotted housing within said tank, elevator means within said housing having arms extending through said slots, bearing means and a circular track, one secured on said arms and the other on said frame and together adapted rotatably to support the frame.

11. A sedimentation apparatus as defined in claim 10 in which the bearing means comprises angularly spaced wheels pivoted on radial axes and adapted to run on the circular track.

12. A sediment raking apparatus for use in a sedimentation tank having conduits for feeding thereto liquid suspension to be treated and an opening at the bottom for removing sludge and an overflow weir, said overflow weir regulating the liquid level in the tank during operation, which comprises a housing vertically slotted above the liquid level of the tank; elevator means mounted within said housing provided with arms extending through said slots in the housing; a rotatable frame rotatably supported on said arms and having outwardly extending members carrying raking means near the bottom of the tank, and having frame members upstanding beside said housing provided with vertical bearing faces adapted to transmit the force required for rotation of the frame; bearing means for said rotatable frame on said elevator arms comprising an annular track on one thereof and cooperating bearing means on the other movable along said track; a motor, and means for transmitting driving force to said frame for rotation thereof comprising driving members movably engaging said bearing faces of the frame members.

13. Apparatus as defined in claim 12 in which the drive transmitting means comprises a gear case fixed on the top of said housing, a gear train pivotally mounted within said case, a spider rotatably supported from said case having internal gear teeth meshing with said gear train and outwardly extending members of said spider being said driving members and having their bearing faces movably engaging said vertical bearing faces on said frame members.

14. A sediment raking apparatus for use in a sedimentation tank which comprises a rotatable frame having frame members extending outwardly and carrying raking means to sweep across the bottom of the tank upon rotation of the frame and having at least one torque transmitting member with a smooth sliding surface of sufficient length parallel to the axis of rotation to accommodate the vertical adjustment of said frame and at a radial distance from said axis sufficient that the pressure thereagainst required to drive said frame against a permissible overload is sufficiently low to permit the sliding of said surface required for elevation of the frame to relieve the overload and the return of the frame from such elevated position by gravity while the frame is being driven under normal load; means for driving said frame mounted on a fixed support adapted to resist the torque reaction of the driving means and having at least one smooth face adapted to engage against said sliding face on said torque transmitting member with area sufficient to keep the driving pressure below that which would prevent said sliding between the pusher face and the torque-transmitting member; elevator means mounted on a fixed anchorage and adapted to support said frame rotatably from said anchorage and to adjust the height of said frame relative to said anchorage, and rotary bearing means in said support between said anchorage and said frame allowing free rotation of the frame while carried on said elevator means.

15. A sediment raking apparatus for a sedimentation tank of the type having a rotatable frame mounted through a horizontal rotational bearing and provided with outwardly extending arms carrying raking means to sweep the bottom of the tank upon rotation of the frame, and means for rotating said frame, which apparatus is characterized by an elevator through which the bearing is supported and by which it is moved vertically to raise and lower said frame to control the thickness of any residual sludge left by the scraper on the bottom of the tank, and a driving connection in said means for rotating the frame, said connection being vertically slidable to accommodate raising and lowering of said frame while said driving means is operating to effect rotation of the frame.

16. An apparatus as characterized in claim 15 which is further characterized in that the driving connection is provided with a plurality of the vertically slidable connections at a substantial radius from the axis of rotation greater than the radius of the rotational bearing and spaced circumferentially about the axis of rotation and is adapted to distribute the driving force among said slidably engaged surfaces.

17. An apparatus as characterized in claim 15 which is further characterized in that the elevator comprises a fluid pressure cylinder and piston provided with a by-pass adapted to allow bleeding of pressure fluid so that when the supply of fluid under pressure is cut off the elevator slowly drops the bearing until the rotatable frame is in its lowermost position.

18. Apparatus according to claim 1 in which the lifting means includes a lifting motor and a variable-slip transmission connection between said motor and the central support, and an automatic adjustment responsive to the power consumption of said driving motor to vary the slip of said connection to apply effective lifting force when a substantial overload occurs and to release said force when the load returns approximately to normal.

19. A sediment raking apparatus for a sedimentation tank of the type having vertically adjustable rotating raking means carried on a rotational bearing for rotation about a vertical axis, a motor and means for transmitting force from the motor to the raking means for driving it in its rotation, which apparatus is characterized by means for raising and lowering adapted to exert on the scraper a direct and gradually releasable force to effect vertical adjustment of the scraper, and means responsive to a substantial overload on said motor for controlling said raising and lowering means to lift the scraper and responsive to a return approximately to normal load to effect the gradual release of said scraper.

20. A sediment raking apparatus as defined in claim 19 in which the means for lifting the scraper is a hydraulic jack, the rotational bearing is carried on said hydraulic jack, the motor is an electric motor, the means responsive to overload is a relay in said motor circuit operating in one direction in response to substantial overload and in the other by return approximately to normal load and electric means controlled by said relay for supplying fluid under pressure to the hydraulic jack, and the means to effect gradual release is an orifice through which said fluid under pressure can escape from the pressure chamber of the hydraulic jack.

ROMAN CHELMINSKI.
OTTO R. KUSTER.
DEALY K. HINES.

REFERENCES CITED

The following references are of record in the file of this patent:

UNITED STATES PATENTS

| Number | Name | Date |
|---|---|---|
| 867,958 | Dorr | Oct. 15, 1907 |
| 1,182,514 | Vandercook | May 9, 1916 |
| 1,734,044 | Orr | Nov. 5, 1929 |
| 1,962,646 | Logue | June 12, 1934 |
| 1,995,559 | Andrews | Mar. 26, 1935 |
| 2,036,809 | Humphreys et al. | Apr. 7, 1936 |
| 2,126,884 | Hardinge | Aug. 16, 1938 |
| 2,226,974 | Hardinge | Dec. 31, 1940 |
| 2,265,046 | Sabin | Dec. 2, 1941 |
| 2,286,397 | Weiss et al. | June 16, 1942 |
| 2,291,836 | Scott | Aug. 4, 1942 |
| 2,295,943 | Finney | Sept. 15, 1942 |
| 2,360,817 | Scott | Oct. 17, 1944 |
| 2,368,703 | Bousman | Feb. 27, 1945 |
| 2,370,120 | Bousman | Feb. 6, 1945 |

FOREIGN PATENTS

| Number | Country | Date |
|---|---|---|
| 459,120 | Great Britain | Dec. 28, 1936 |